United States Patent
Horikawa et al.

(10) Patent No.: US 11,681,910 B2
(45) Date of Patent: Jun. 20, 2023

(54) TRAINING APPARATUS, RECOGNITION APPARATUS, TRAINING METHOD, RECOGNITION METHOD, AND PROGRAM

(71) Applicant: Sony Interactive Entertainment Inc., Tokyo (JP)

(72) Inventors: Tsutomu Horikawa, Kanagawa (JP); Daichi Ono, Kanagawa (JP)

(73) Assignee: Sony Interactive Entertainment Inc., Tokyo (JP)

( * ) Notice: Subject to any disclaimer, the term of this patent is extended or adjusted under 35 U.S.C. 154(b) by 125 days.

(21) Appl. No.: 16/621,796

(22) PCT Filed: Jul. 28, 2017

(86) PCT No.: PCT/JP2017/027419
§ 371 (c)(1),
(2) Date: Dec. 12, 2019

(87) PCT Pub. No.: WO2019/021456
PCT Pub. Date: Jan. 31, 2019

(65) Prior Publication Data
US 2020/0193632 A1  Jun. 18, 2020

(51) Int. Cl.
*G06N 3/08* (2023.01)
*G06T 7/50* (2017.01)
(Continued)

(52) U.S. Cl.
CPC ........... *G06N 3/08* (2013.01); *G06F 18/2148* (2023.01); *G06N 20/00* (2019.01); *G06T 7/0002* (2013.01);
(Continued)

(58) Field of Classification Search
CPC ........... G06T 7/73; G06T 7/50; G06T 7/0002; G06T 2200/04; G06T 2207/10004;
(Continued)

(56) References Cited

U.S. PATENT DOCUMENTS

| 5,027,652 A | * | 7/1991 | Goebel | G01F 1/692 |
| | | | | 73/204.26 |
| 9,432,720 B2 | * | 8/2016 | Kruglick | G11B 27/10 |

(Continued)

FOREIGN PATENT DOCUMENTS

| AU | 2021202 A | * | 5/2002 | ........... H04N 19/597 |
| CN | 103890752 A | | 6/2014 | |

(Continued)

OTHER PUBLICATIONS

International Preliminary Report on Patentability and Written Opinion for corresponding PCT Application No. PCT/JP2017/027419, 11 pages, dated Feb. 6, 2020.

(Continued)

*Primary Examiner* — Jerome Grant, II
(74) *Attorney, Agent, or Firm* — Matthew B. Dernier, Esq.

(57) ABSTRACT

Provided are a training apparatus, a recognition apparatus, a training method, a recognition method, and a program that can accurately recognize what an object represented in an image associated with depth information is. An object data acquiring section acquires three-dimensional data representing an object. A training data generating section generates a plurality of training data each representing a mutually different part of the object on the basis of the three-dimensional data. A training section trains a machine learning model using the generated training data as the training data for the object.

8 Claims, 6 Drawing Sheets

(51) Int. Cl.
*G06T 7/73* (2017.01)
*G06N 20/00* (2019.01)
*G06T 7/00* (2017.01)
*G06F 18/214* (2023.01)
*G06V 10/774* (2022.01)
*G06V 20/64* (2022.01)

(52) U.S. Cl.
CPC ............ *G06T 7/50* (2017.01); *G06T 7/73* (2017.01); *G06V 10/7747* (2022.01); *G06V 20/64* (2022.01); *G06T 2200/04* (2013.01); *G06T 2207/10004* (2013.01)

(58) Field of Classification Search
CPC . G06T 2207/10028; G06T 2207/20081; G06T 2207/20084; G06N 20/00; G06N 3/08; G06N 3/0454; G06K 9/6257; G06K 9/00201
USPC .......................................................... 382/154
See application file for complete search history.

(56) References Cited

U.S. PATENT DOCUMENTS

| | | | |
|---|---|---|---|
| 9,508,152 | B2 | 11/2016 | Yoo |
| 10,417,781 | B1 * | 9/2019 | Konolige ................. G06T 7/60 |
| 2015/0023557 | A1 | 1/2015 | Yoo |
| 2016/0342861 | A1 | 11/2016 | Tuzel |
| 2017/0161590 | A1 * | 6/2017 | Boulkenafed ........ G06K 9/6215 |
| 2018/0136332 | A1 * | 5/2018 | Barfield, Jr. ............. G06T 7/70 |
| 2018/0144185 | A1 * | 5/2018 | Yoo ........................... G06K 9/66 |
| 2018/0350063 | A1 * | 12/2018 | Nakano ..................... G06T 7/73 |
| 2019/0332938 | A1 * | 10/2019 | Gendron-Bellemare .................... G06N 3/0445 |
| 2020/0202635 | A1 * | 6/2020 | Liang ...................... A61B 8/483 |
| 2020/0234192 | A1 * | 7/2020 | Vinyals ..................... G06N 7/00 |
| 2021/0142553 | A1 * | 5/2021 | Zatonyi ................. G06T 15/503 |
| 2021/0192230 | A1 * | 6/2021 | Michiguchi ........ G06K 9/00791 |

FOREIGN PATENT DOCUMENTS

| | | | |
|---|---|---|---|
| CN | 106169082 A | 11/2016 | |
| CN | 106228177 A | 12/2016 | |
| JP | 05019052 A | 1/1993 | |
| JP | 2003346152 A | 12/2003 | |
| WO | WO2018129132 | * 7/2018 | ............... G06K 9/62 |

OTHER PUBLICATIONS

International Search Report for corresponding PCT Application No. PCT/JP2017/027419, 4 pages, dated Oct. 24, 2017.
Takeshi Ikeya et al., "Deep Convolutional Neural Network 0 Mochiita Buttai No. 3 Jikukaiten nl Gankyo na 3 Jigen Keijo Hikaku ni Mukete", Visual Computing/Graphics and CAD Joint Symposium 2016 Yokoshu, pp. 105-111. Jun. 11, 2016.
Ren Kana I et al., "3D Object Recognition using Convolutional Neural Networks with 3D Filters", Dai 78 Kai (Heisei 28 Nen) Zenkoku Taikai Koen Ronbunshu (2) Jinko Chino to Ninchi Kagaku, pp. e2-37 to 2-38, Mar. 10, 2016.
Office Action for corresponding CN Application No. 201780093425. 3, 18 pages, dated Mar. 3, 2023.

* cited by examiner

TRAINING APPARATUS, RECOGNITION APPARATUS, TRAINING METHOD, RECOGNITION METHOD, AND PROGRAM

TECHNICAL FIELD

The present invention relates to a training apparatus, a recognition apparatus, a training method, a recognition method, and a program.

BACKGROUND ART

There is a known technology for recognizing what an object represented in three-dimensional data is by executing a recognition process on the three-dimensional data such as voxel data using a trained model such as a three-dimensional convolutional neural network.

SUMMARY TECHNICAL PROBLEM

For example, it is conceivable to recognize what an object represented in an image is on the basis of an output when three-dimensional data generated on the basis of the image associated with depth information has been input into the above-described trained model.

However, a part that is not represented in the image associated with the depth information is not represented in the three-dimensional data generated on the basis of the image. Therefore, the three-dimensional data generated in this manner does not represent a complete three-dimensional shape of the object.

Accordingly, in a case where the trained model used for recognition has been trained using three-dimensional data representing the complete three-dimensional shape of the object as the training data, accurately recognizing what the object represented in the image associated with the depth information is has occasionally resulted in failure.

The present invention has been made in view of the issue described above. One of objects of the present invention is to provide a training apparatus, a recognition apparatus, a training method, a recognition method, and a program that can accurately recognize what an object represented in an image associated with depth information is.

Solution to Problem

In order to solve the issue described above, a training apparatus according to the present invention is a training apparatus for training a machine learning model used for a process of recognizing what an object represented in an image associated with depth information is and includes: a three-dimensional data acquiring section configured to acquire three-dimensional data representing an object; a training data generating section configured to generate a plurality of training data each representing a mutually different part of the object on the basis of the three-dimensional data; and a training section configured to train the machine learning model using the generated training data as the training data for the object.

In one aspect of the present invention, the training data generating section is configured to generate, for each of a plurality of mutually different positions in a virtual space in which the object is arranged, training data representing a part of the object that is visible from a corresponding one of the positions.

In addition, in one aspect of the present invention, the training apparatus is configured to train the machine learning model into which three-dimensional data generated on the basis of an image associated with depth information is input as recognition target data, the training data generating section is configured to generate the training data including three-dimensional data, and the training section is configured to train the machine learning model using the generated three-dimensional data as the training data for the object.

Alternatively, the training apparatus is configured to train the machine learning model into which an image associated with depth information is input as recognition target data, the training data generating section is configured to generate the training data including an image associated with depth information, and the training section is configured to train the machine learning model using the generated image associated with the depth information as the training data for the object.

In addition, a recognition apparatus according to the present invention is a recognition apparatus for executing a process of recognizing what an object represented in an image associated with depth information is and includes: a trained model having learned training data generated on the basis of three-dimensional data representing an object as the training data for the object, the training data each representing a mutually different part of the object; and a recognition section configured to recognize what the object represented in the image associated with the depth information is on the basis of an output when recognition target data corresponding to the image has been input into the trained model.

In addition, a training method according to the present invention is a training method for training a machine learning model used for a process of recognizing what an object represented in an image associated with depth information is and includes: a step of acquiring three-dimensional data representing an object; a step of generating a plurality of training data each representing a mutually different part of the object on the basis of the three-dimensional data; and a step of training the machine learning model using the generated training data as the training data for the object.

In addition, a recognition method according to the present invention is a recognition method for executing a process of recognizing what an object represented in an image associated with depth information is and includes: a step of inputting recognition target data corresponding to the image into a trained model having learned training data generated on the basis of three-dimensional data representing an object as the training data for the object, the training data each representing a mutually different part of the object; and a step of recognizing what the object represented in the image associated with the depth information is on the basis of an output when the recognition target data has been input into the trained model.

In addition, a program according to the present invention is a program for training a machine learning model used for a process of recognizing what an object represented in an image associated with depth information is and causes a computer to execute: a step of acquiring three-dimensional data representing an object; a step of generating a plurality of training data each representing a mutually different part of the object on the basis of the three-dimensional data; and a step of training the machine learning model using the generated training data as the training data for the object.

In addition, another program according to the present invention is a program for executing a process of recognizing what an object represented in an image associated with depth information is and causes a computer to execute: a step of inputting recognition target data corresponding to the image into a trained model having learned training data generated on the basis of three-dimensional data representing an object as the training data for the object, the training data each representing a mutually different part of the object; and a step of recognizing what the object represented in the image associated with the depth information is on the basis of an output when the recognition target data has been input into the trained model.

DESCRIPTION OF EMBODIMENT

Hereinafter, one embodiment of the present invention will be described in detail with reference to the drawings.

Figure 1:
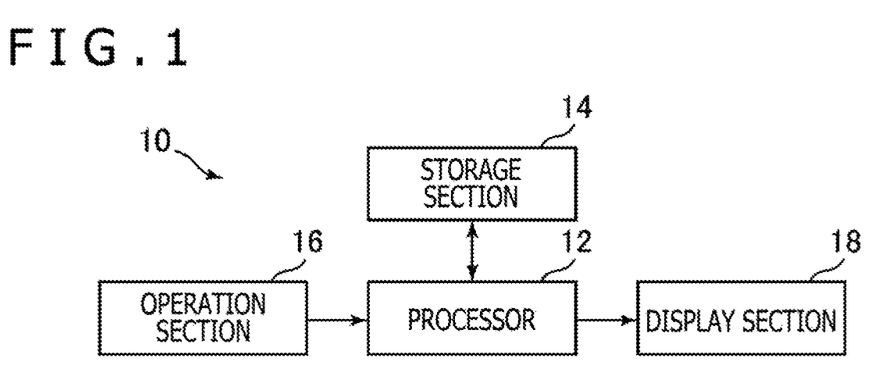
FIG. 1 is a configuration diagram of an information processing apparatus according to one embodiment of the present invention.

FIG. 1 is a configuration diagram of an information processing apparatus 10 according to one embodiment of the present invention. The information processing apparatus 10 according to the present embodiment is a computer such as a game console or a personal computer, for example. As illustrated in FIG. 1, the information processing apparatus 10 according to the present embodiment includes, for example, a processor 12, a storage section 14, an operation section 16, and a display section 18.

The processor 12 is a program control device such as a central processing unit (CPU) that operates according to a program installed in the information processing apparatus 10, for example.

The storage section 14 is a storage device such as a read-only memory (ROM) or a random access memory (RAM), a hard disk drive, or the like. The storage section 14 stores the program and the like to be executed by the processor 12.

The operation section 16 is a user interface such as a keyboard, a mouse, or a controller of a game console. The operation section 16 receives an operation input from the user and outputs a signal indicating what the operation input is to the processor 12.

The display section 18 is a display device such as a liquid crystal display, and displays various types of images according to instructions from the processor 12.

It is noted that the information processing apparatus 10 may include a communication interface such as a network board, an optical disc drive for reading an optical disc such as a digital versatile disc (DVD)-ROM or a Blu-ray (registered trademark) disc, a universal serial bus (USB) port, and the like.

The information processing apparatus 10 according to the present embodiment executes a process of recognizing what an object represented in an image associated with depth information is.

Here, the above-described image that is a recognition target may be a captured image associated with a depth image. The captured image is captured by a stereo camera, a camera with an infrared distance measuring sensor, or the like.

In addition, for example, depth information corresponding to the positions, orientations, and angles of view of cameras when captured images have been captured may be generated on the basis of the captured images obtained by capturing a subject from a plurality of directions.

Further, in the present embodiment, a machine learning model such as a two-dimensional convolutional neural network (two-dimensional CNN) or a three-dimensional convolutional neural network (three-dimensional CNN) is used to recognize what the object represented in the above-described image is.

Figure 2:
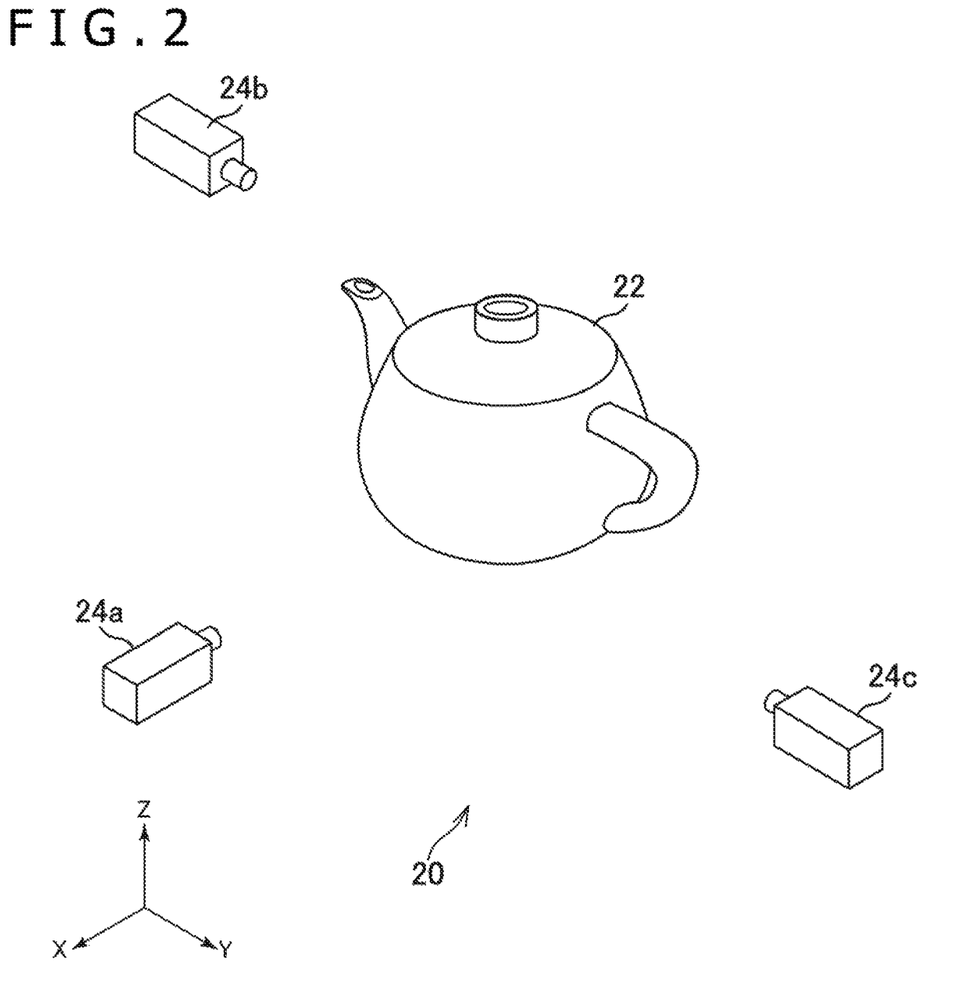
FIG. 2 is a diagram illustrating an example of how an object to be learned by a machine learning model is arranged in a virtual space.

FIG. 2 is a diagram illustrating an example of how an object to be learned by the above-described machine learning model is arranged in a virtual space 20. In FIG. 2, a teapot 22 is illustrated as an example of the object to be learned by the machine learning model. The teapot 22 is represented by voxel data in which positions and voxel values correspond to each other. Here, the representation format of three-dimensional data representing the object is not limited to the voxel data. For example, the object may be represented by a wireframe, a polygon, a surface, a solid, or the like. In addition, for example, the object may be represented by a point cloud (point group). In addition, the three-dimensional data representing the object may include information regarding colors associated with positions in a three-dimensional space, such as grayscale gradation values or RGB values at the respective positions.

Further, in the present embodiment, training data are generated. The training data each corresponds to a part that is visible when the object is seen from a corresponding one of a plurality of mutually different positions in the virtual space 20 illustrated in FIG. 2. For example, training data generated herein each corresponds to a part represented in a corresponding one of images of the object captured by respective virtual cameras 24 illustrated in FIG. 2.

Figure 3A:
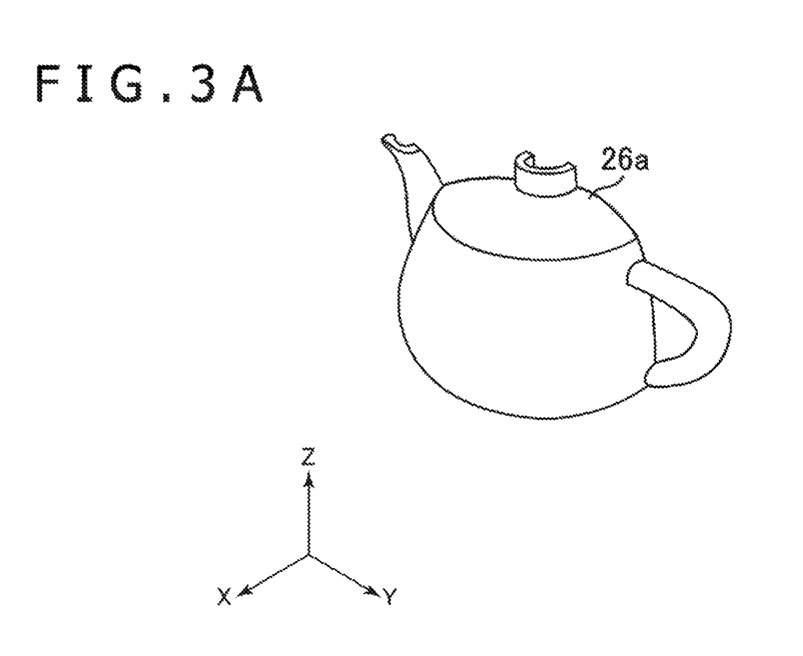
FIG. 3A is a diagram illustrating an example of a first part.
Figure 3B:
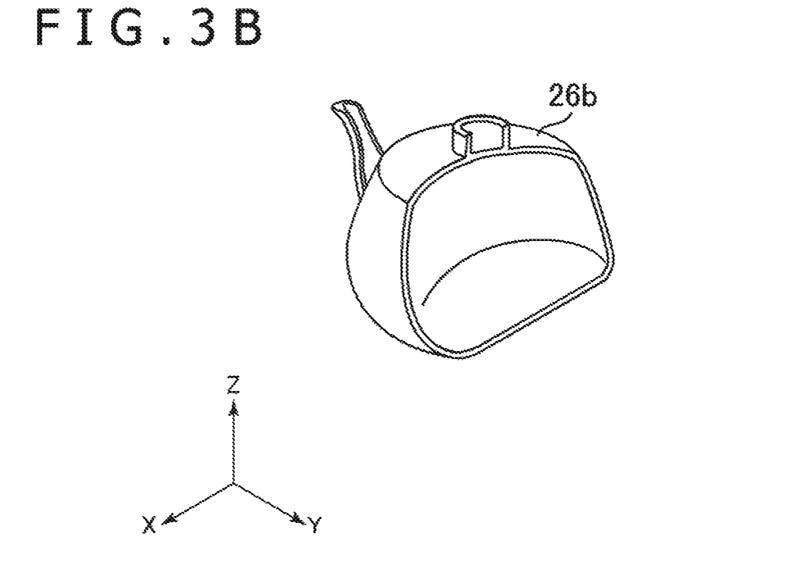
FIG. 3B is a diagram illustrating an example of a second part.

FIG. 2 illustrates the three virtual cameras 24 (24a, 24b, and 24c) by way of example. Here, for example, the virtual camera 24a may generate an image representing an appearance of the teapot 22 viewed from the left. In addition, for example, the virtual camera 24b may generate an image representing an appearance of the teapot 22 viewed from the front. In addition, for example, the virtual camera 24c may generate an image representing an appearance of the teapot 22 viewed from the back. FIG. 3A illustrates a first part 26a, which is a part represented in an image of the object captured by the virtual camera 24a. FIG. 3B illustrates a second part 26b, which is a part represented in an image of the object captured by the virtual camera 24b. Further, FIG.

Figure 3C:
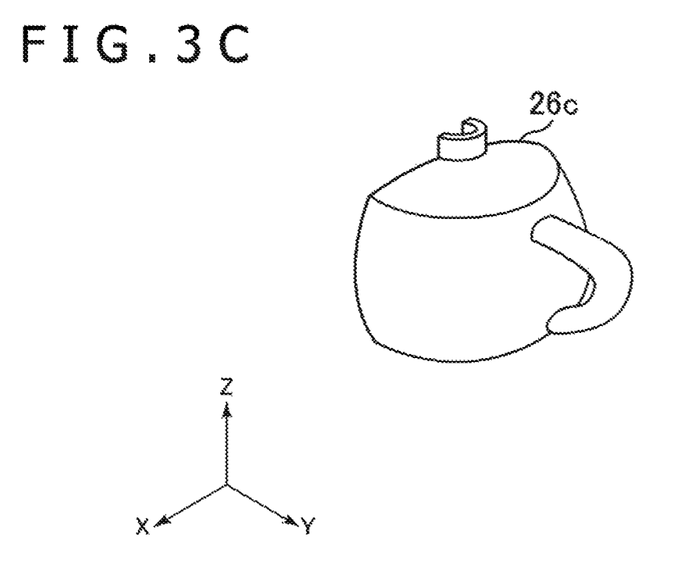
FIG. 3C is a diagram illustrating an example of a third part.

3C illustrates a third part 26c, which is a part represented in an image of the object captured by the virtual camera 24c.

Further, in the present embodiment, the machine learning model is trained using training data corresponding to each of the first part 26a, the second part 26b, and the third part 26c as the training data for the object (the teapot 22 herein, for example). For example, the machine learning model may be trained using training data including three-dimensional data such as voxel data representing the first part 26a, the second part 26b, and the third part 26c as input data and including the name of the object (for example, "teapot") as teaching data.

Here, as with the representation format of the data representing the object, the representation format of the training data is not limited to the voxel data in which positions and voxel values correspond to each other. For example, the training data may be represented by three-dimensional data such as the wireframe, the polygon, the surface, the solid, or the like. In addition, for example, the training data may be represented by the point group (point cloud). In addition, the training data may include information regarding colors associated with positions in the three-dimensional space, such as grayscale gradation values or RGB values at the respective positions.

In addition, as described below, for example, two-dimensional images 28 associated with depth information may be used as the training data. The two-dimensional images 28 each represent an appearance of the object viewed from a corresponding one of the virtual cameras 24. Here, each two-dimensional image 28 used as the training data may include information regarding the color of each pixel such as grayscale gradation values or RGB values.

Figure 4A:
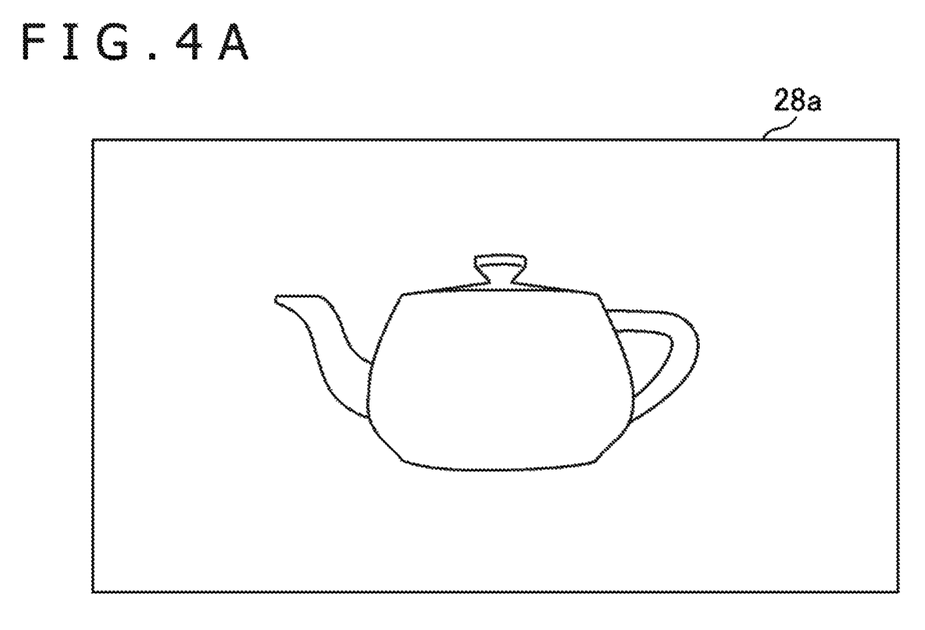
FIG. 4A is a diagram illustrating an example of a first two-dimensional image.
Figure 4B:
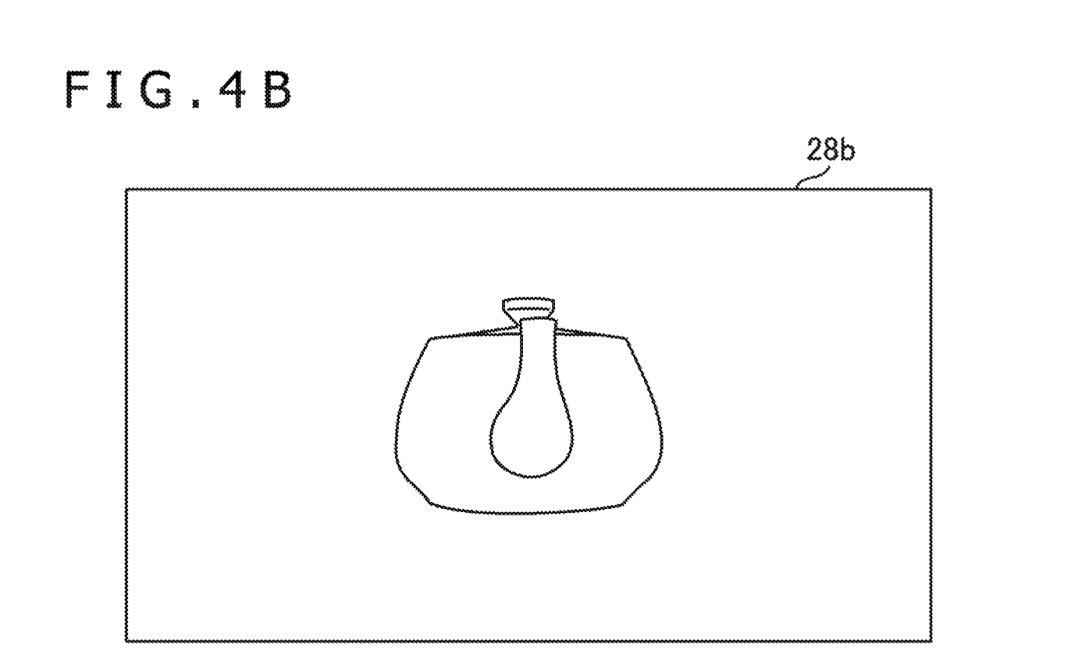
FIG. 4B is a diagram illustrating an example of a second two-dimensional image.
Figure 4C:
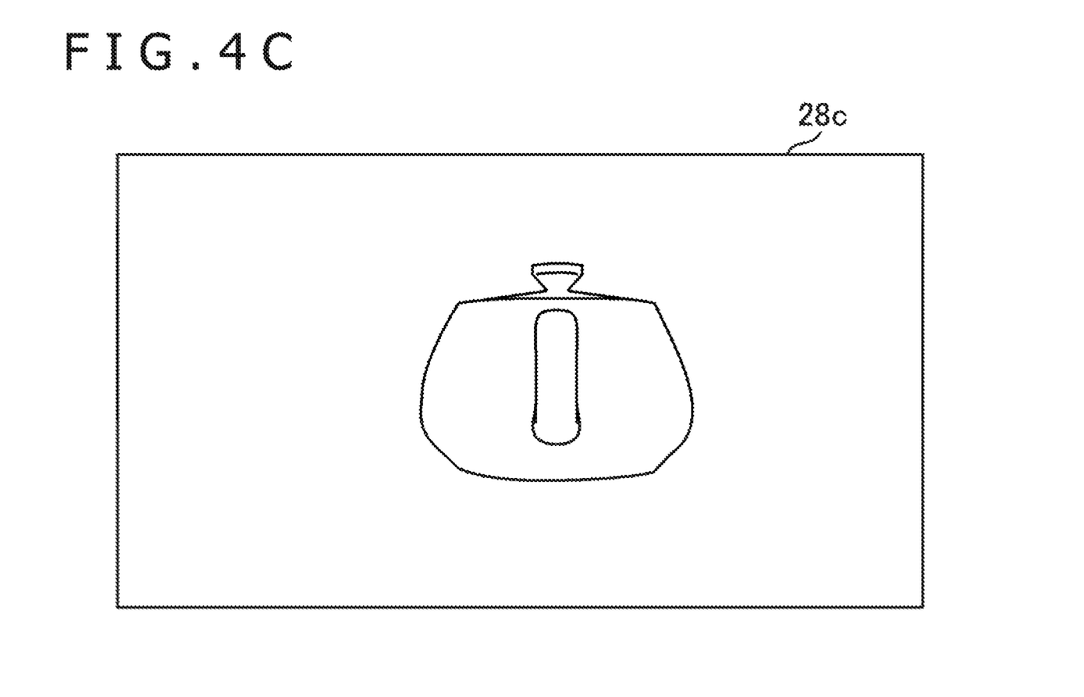
FIG. 4C is a diagram illustrating an example of a third two-dimensional image.

FIGS. 4A to 4C respectively illustrate a first two-dimensional image 28a representing an appearance of the object viewed from the virtual camera 24a, a second two-dimensional image 28b representing an appearance of the object viewed from the virtual camera 24b, and a third two-dimensional image 28c representing an appearance of the object viewed from the virtual camera 24c.

Further, for example, a first depth image may be generated together with the first two-dimensional image 28a. The first depth image corresponds to each of pixels included in the first two-dimensional image 28a and represents the distribution of distances from the virtual camera 24a to the subject. Further, the machine learning model may be trained using the first two-dimensional image 28a associated with the first depth image as the training data. Here, for example, the machine learning model may be trained using the training data including the first two-dimensional image 28a and the first depth image as the input data and including the name of the object as the teaching data.

In addition, for example, a second depth image may be generated together with the second two-dimensional image 28b. The second depth image corresponds to each of pixels included in the second two-dimensional image 28b and represents the distribution of distances from the virtual camera 24b to the subject. Further, the machine learning model may be trained using the second two-dimensional image 28b associated with the second depth image as the training data. Here, for example, the machine learning model may be trained using the training data including the second two-dimensional image 28b and the second depth image as the input data and including the name of the object as the teaching data.

In addition, for example, a third depth image may be generated together with the third two-dimensional image 28c. The third depth image corresponds to each of pixels included in the third two-dimensional image 28c and represents the distribution of distances from the virtual camera 24c to the subject. Further, the machine learning model may be trained using the third two-dimensional image 28c associated with the third depth image as the training data. Here, for example, the machine learning model may be trained using the training data including the third two-dimensional image 28c and the third depth image as the input data and including the name of the object as the teaching data.

Further, in the present embodiment, for example, what an object represented in an image associated with depth information is, is recognized on the basis of an output when recognition target data has been input into the trained machine learning model that has been trained for a plurality of objects in the above-described manner. Here, the image may include information regarding the color of each pixel such as grayscale gradation values or RGB values.

Here, for example, in a case where training has been performed using the three-dimensional data such as the voxel data as the training data, three-dimensional data generated on the basis of the image associated with the depth information may be used as the recognition target data to be input into the trained machine learning model. Here, the three-dimensional data used as the recognition target data may include information regarding colors associated with positions in the three-dimensional space, such as grayscale gradation values or RGB values at the respective positions.

In addition, for example, in a case where training has been performed using images associated with depth information such as two-dimensional images and depth images as the training data, the image associated with the depth information itself may be used as the recognition target data to be input into the trained machine learning model.

Here, in the present embodiment, as described above, training is performed using a plurality of training data for one object. Here, for example, in a case where the recognition target data is similar to any of the plurality of training data corresponding to the teapot 22, the object represented in the image associated with the depth information may be recognized as the teapot 22.

It is noted that, although FIGS. 3A to 3C and FIGS. 4A to 4C illustrate an example in which three training data are generated for one object, a greater or smaller number of training data may be generated for one object. In addition, for example, training data (for example, 24 training data) corresponding to each of whole orientations including not only the orientations viewed from the sides, the front, and the back but also the orientations from the top and the bottom and corresponding to individual parts that are visible when the object is viewed from the respective orientations may be generated.

In addition, for example, generation of some training data may be omitted in the case of symmetry. Specifically, in the case of a bilaterally symmetrical object, training data corresponding to only either a part that is visible when viewed from the left or a part that is visible when viewed from the right may be generated, for example. In addition, for example, in a case where a plurality of similar training data is generated, only one of these training data may be used to train the machine learning model.

There is a large difference between the shape represented in recognition target data corresponding to an image associated with depth information and a complete three-dimensional shape of an object. Therefore, using a machine learning model trained using three-dimensional data representing a complete three-dimensional shape of the object illustrated in FIG. 2 as the training data, for example, has occasionally resulted in a failure to accurately recognize what the object represented in the image associated with the depth information is.

In view of the above-described situation, in the present embodiment, the machine learning model that has been trained using the training data each representing a mutually different part of the object is used to recognize what the object represented in the image associated with the depth information is, as described above. In this manner, according to the present embodiment, it is possible to accurately recognize what the object represented in the image associated with the depth information is.

Hereinafter, functions of the information processing apparatus 10 according to the present embodiment and processes executed by the information processing apparatus 10 will be further described.

Figure 5:
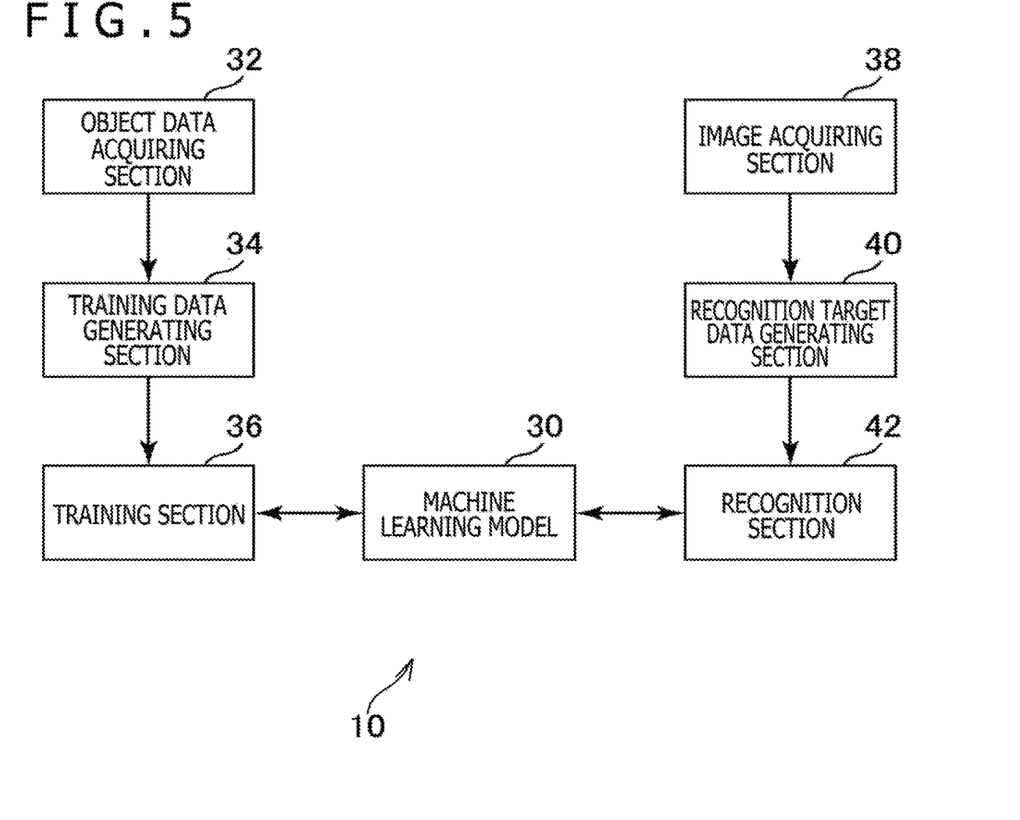
FIG. 5 is a functional block diagram illustrating an example of functions implemented in the information processing apparatus according to one embodiment of the present invention.

FIG. 5 is a functional block diagram illustrating an example of the functions implemented in the information processing apparatus 10 according to the present embodiment. It is noted that the information processing apparatus 10 according to the present embodiment does not need to include all the functions illustrated in FIG. 5 and may include functions other than the functions illustrated in FIG. 5.

As illustrated in FIG. 5, the information processing apparatus 10 functionally includes a machine learning model 30, an object data acquiring section 32, a training data generating section 34, a training section 36, an image acquiring section 38, a recognition target data generating section 40, and a recognition section 42, for example. The above-described components are mainly implemented by the processor 12 and the storage section 14. The information processing apparatus 10 according to the present embodiment has roles both as a training apparatus that trains the machine learning model 30 and as a recognition apparatus that executes the process of recognizing what an object represented in an image associated with depth information is. The machine learning model 30, the object data acquiring section 32, the training data generating section 34, and the training section 36 correspond to the functions of the training apparatus. The machine learning model 30, the image acquiring section 38, the recognition target data generating section 40, and the recognition section 42 correspond to the functions of the recognition apparatus.

The above-described functions may be implemented by causing the processor 12 to execute the program that includes instructions corresponding to the above-described functions and that is installed in the information processing apparatus 10, which is the computer. This program may be supplied to the information processing apparatus 10 through a computer-readable information storage medium such as an optical disc, a magnetic disk, a magnetic tape, a magneto-optical disc, or a flash memory, the Internet, or the like, for example.

In the present embodiment, the machine learning model 30 is, for example, a machine learning model such as a two-dimensional convolutional neural network (two-dimensional CNN) or a three-dimensional convolutional neural network (three-dimensional CNN).

In the present embodiment, the object data acquiring section 32 acquires, for example, three-dimensional data to be used as the basis of training data and representing an object as illustrated in FIG. 2.

In the present embodiment, for example, the training data generating section 34 generates a plurality of training data each representing a mutually different part of the object on the basis of the three-dimensional data acquired by the object data acquiring section 32. Here, for each of a plurality of mutually different positions in the virtual space 20 in which the object is arranged, the training data generating section 34 may generate training data representing a part of the object that is visible from a corresponding one of the positions, for example.

In the present embodiment, for example, the training section 36 trains the machine learning model 30 using the training data generated by the training data generating section 34 as the training data for the object.

In the present embodiment, for example, the image acquiring section 38 acquires an image associated with depth information. The image is a target for recognizing what an object represented therein is.

In the present embodiment, for example, the recognition target data generating section 40 generates recognition target data to be input into the trained machine learning model 30 on the basis of the image associated with the depth information that has been acquired by the image acquiring section 38.

In the present embodiment, for example, the recognition section 42 recognizes what the object represented in the image is on the basis of an output when the recognition target data corresponding to the image associated with the depth information acquired by the image acquiring section 38 has been input into the trained model.

Here, for example, in a case where the machine learning model 30 is the three-dimensional CNN, the training data generating section 34 may generate training data including three-dimensional data such as the voxel data, the point cloud, the wireframe, the polygon, the surface, or the solid. Further, in this case, the training section 36 may train the three-dimensional CNN using the generated three-dimensional data as the training data.

Further, in this case, the recognition target data generating section 40 may generate three-dimensional data such as the voxel data, the wireframe, the polygon, the surface, or the solid on the basis of the image associated with the depth information acquired by the image acquiring section 38. Further, the recognition section 42 may recognize what the object represented in the image associated with the depth information acquired by the image acquiring section 38 is on the basis of an output when the recognition target data including the three-dimensional data has been input into the trained three-dimensional CNN.

In addition, for example, in a case where the machine learning model 30 is the two-dimensional CNN, the training data generating section 34 may generate training data including a two-dimensional image associated with depth information (for example, a two-dimensional image with a depth image). Further, in this case, the training section 36 may train the two-dimensional CNN using the generated image as the training data.

Further, in this case, the recognition section 42 may recognize what the object represented in the image associated with the depth information acquired by the image acquiring section 38 is on the basis of an output when the image associated with the depth information acquired by the image acquiring section 38 has been input into the trained two-dimensional CNN. In this case, recognition target data is not generated by the recognition target data generating section 40, and the image associated with the depth information itself acquired by the image acquiring section 38 is used as the recognition target data corresponding to the image. That is, in this case, the image associated with the depth information itself is input into the trained machine learning model 30 as the recognition target data corresponding to the image.

Figure 6:
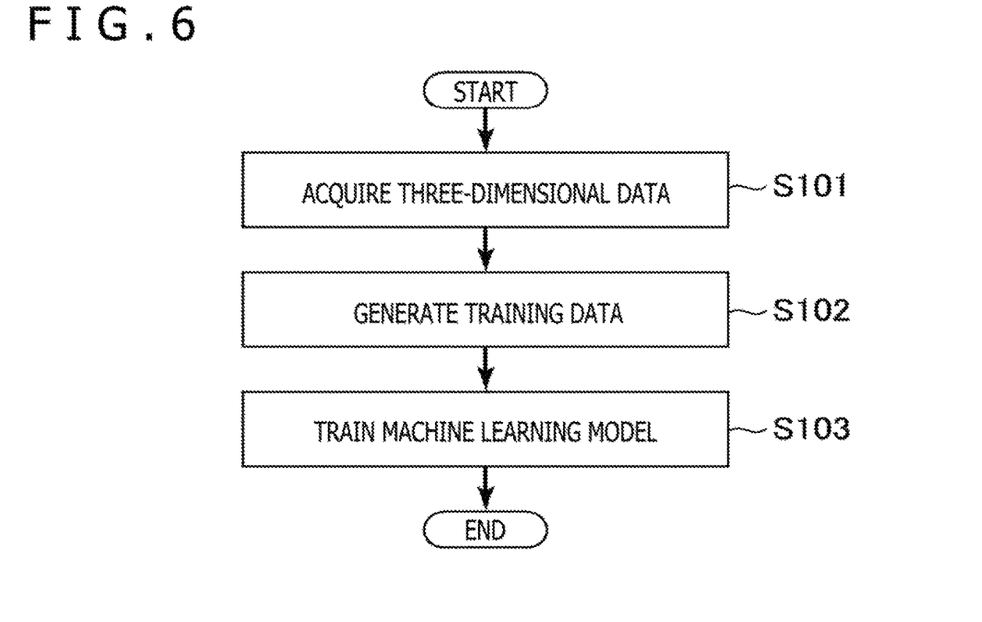
FIG. 6 is a flow diagram illustrating an example of a flow of a training process executed by the information processing apparatus according to one embodiment of the present invention.

Here, an example of a flow of the training process executed by the information processing apparatus 10 according to the present embodiment will be described with reference to a flow diagram illustrated in FIG. 6.

First, the object data acquiring section 32 acquires three-dimensional data that is used as the basis of the training data (S101).

Then, the training data generating section 34 generates a plurality of training data corresponding to an object represented in the three-dimensional data on the basis of the three-dimensional data acquired in the process illustrated in S101 (S102). Here, as described above, each of the plurality of training data represents a mutually different part of the object represented in the three-dimensional data acquired in the process illustrated in S101.

Then, the training section 36 trains the machine learning model 30 using the training data generated in the process illustrated in S102 as the training data for the object represented in the three-dimensional data acquired in the process illustrated in S101 (S103).

Here, the training illustrated in S101 to S103 may be performed for a large number of objects using three-dimensional data representing these objects.

Figure 7:
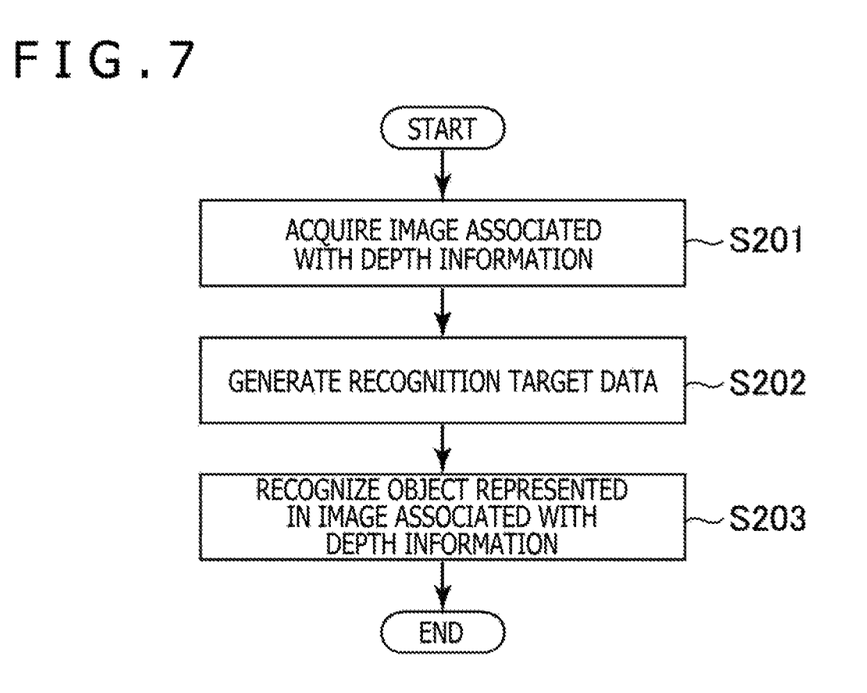
FIG. 7 is a flow diagram illustrating an example of a flow of a recognition process executed by the information processing apparatus according to one embodiment of the present invention.

Next, an example of a flow of a recognition process executed by the information processing apparatus 10 according to the present embodiment will be described with reference to a flow diagram illustrated in FIG. 7.

First, the image acquiring section 38 acquires an image associated with depth information that is a recognition target (S201).

Then, the recognition target data generating section 40 generates recognition target data on the basis of the image acquired in the process illustrated in S201 (S202).

Then, the recognition section 42 recognizes an object represented in the image acquired in the process illustrated in S201 on the basis of an output when the recognition target data generated in the process illustrated in S202 has been input into the trained machine learning model 30 (S203).

Here, as described above, it is not necessary to execute the process illustrated in S202. Further, in this case, in the process illustrated in S203, the object represented in the image may be recognized on the basis of an output when the image associated with the depth information acquired in the process illustrated in S201 has been input into the trained machine learning model 30 as the recognition target data corresponding to the image.

It is noted that the present invention is not limited to the above-described embodiment.

In addition, specific character strings and numerical values described above and specific character strings and numerical values in the drawings are presented by way of example, and character strings and numerical values are not limited to these character strings and numerical values.

The invention claimed is:

1. A training apparatus for training a machine learning model used to identify an object represented in an image, the training apparatus comprising:
a three-dimensional data acquiring circuit operating to acquire three-dimensional data representing a complete virtual three-dimensional shape of an object;
a training data generating circuit operating to generate a plurality of training data sets from the complete virtual three-dimensional shape of the object, each training data set including a two-dimensional data representation for only a portion of the object viewed from a respective viewpoint in a virtual space, including all features of the appearance of the object from the respective viewpoint, and associated depth information, such that each training data set represents a mutually different part of the object; and
a training circuit operating to train the machine learning model to identify the object using the plurality of training data sets.

2. The training apparatus according to claim 1, wherein
the training circuit operates to train the machine learning model by inputting recognition target data comprising the plurality of training data sets, including the two-dimensional data, as three-dimensional data generated on a basis of image data associated with the depth information, and
the training data generating circuit operates to generate the plurality of training data sets, each including the three-dimensional data.

3. The training apparatus according to claim 1, wherein
the training operates to train the machine learning model by inputting recognition target data comprising the plurality of training data sets, including the two-dimensional, as an image associated with the depth information, and
the training data generating circuit operates to generate the plurality of training data sets, each including the image associated with the depth information.

4. A recognition apparatus for executing a process of identifying an object represented in an image, the recognition apparatus comprising:
a machine learning model; and
a recognition circuit operating to identify the object represented in the image on a basis of an output from the machine learning model in response to recognition target data corresponding to the image,
wherein the machine learning model has been trained via a process comprising:
acquiring three-dimensional data representing a complete virtual three-dimensional shape of an object;
generating a plurality of training data sets from the complete virtual three-dimensional shape of the object, each training data set including a two-dimensional data representation for only a portion of the object viewed from a respective viewpoint in a virtual space, including all features of the appearance of the object from the respective viewpoint, and associated depth information, such that each training data set represents a mutually different part of the object; and
training the machine learning model to identify the object using the plurality of training data sets.

5. A training method for training a machine learning model used for a process of identifying an object represented in an image, the training method comprising:
acquiring three-dimensional data representing a complete virtual three-dimensional shape of an object;
generating a plurality of training data sets from the complete virtual three-dimensional shape of the object, each training data set including a two-dimensional data representation for only a portion of the object viewed from a respective viewpoint in a virtual space, including all features of the appearance of the object from the respective viewpoint, and associated depth information, such that each training data set represents a mutually different part of the object; and
training the machine learning model to identify the object using the plurality of training data sets.

6. A recognition method for executing a process of identifying an object represented in an image, the recognition method comprising:
- inputting recognition target data corresponding to the image into a machine learning model; and
- identifying the object represented in the image on a basis of an output from the machine learning model in response to the recognition target data,
- wherein the machine learning model has been trained via a process comprising:
- acquiring three-dimensional data representing a complete virtual three-dimensional shape of an object;
- generating a plurality of training data sets from the complete virtual three-dimensional shape of the object, each training data set including a two-dimensional data representation for only a portion of the object viewed from a respective viewpoint in a virtual space, including all features of the appearance of the object from the respective viewpoint, and associated depth information, such that each training data set represents a mutually different part of the object; and
- training the machine learning model to identify the object using the plurality of training data sets.

7. A non-transitory, computer-readable storage medium containing a program, which when executed by a computer, causes the computer to carry out a process for training a machine learning model used for a process of identifying an object represented in an image, by carrying out actions, comprising:
- acquiring three-dimensional data representing a complete virtual three-dimensional shape of an object;
- generating a plurality of training data sets from the complete virtual three-dimensional shape of the object, each training data set including a two-dimensional data representation for only a portion of the object viewed from a respective viewpoint in a virtual space, including all features of the appearance of the object from the respective viewpoint, and associated depth information, such that each training data set represents a mutually different part of the object; and
- training the machine learning model to identify the object using the plurality of training data sets.

8. A non-transitory, computer-readable storage medium containing a program, which when executed by a computer, causes the computer to carry out a process of identifying an object represented in an image, by carrying out actions, comprising:
- inputting recognition target data corresponding to the image into a machine learning model; and
- identifying the object represented in the image on a basis of an output from the machine learning model in response to the recognition target data,
- wherein the machine learning model has been trained via a process comprising:
- acquiring three-dimensional data representing a complete virtual three-dimensional shape of an object;
- generating a plurality of training data sets from the complete virtual three-dimensional shape of the object, each training data set including a two-dimensional data representation for only a portion of the object viewed from a respective viewpoint in a virtual space, including all features of the appearance of the object from the respective viewpoint, and associated depth information, such that each training data set represents a mutually different part of the object; and
- training the machine learning model to identify the object using the plurality of training data sets.

* * * * *